H. M. STEVENS.
LUBRICATING DEVICE FOR VALVES AND CYLINDERS OF SUPERHEATING LOCOMOTIVES.
APPLICATION FILED APR. 28, 1919.
1,351,807.
Patented Sept. 7, 1920.
3 SHEETS—SHEET 1.
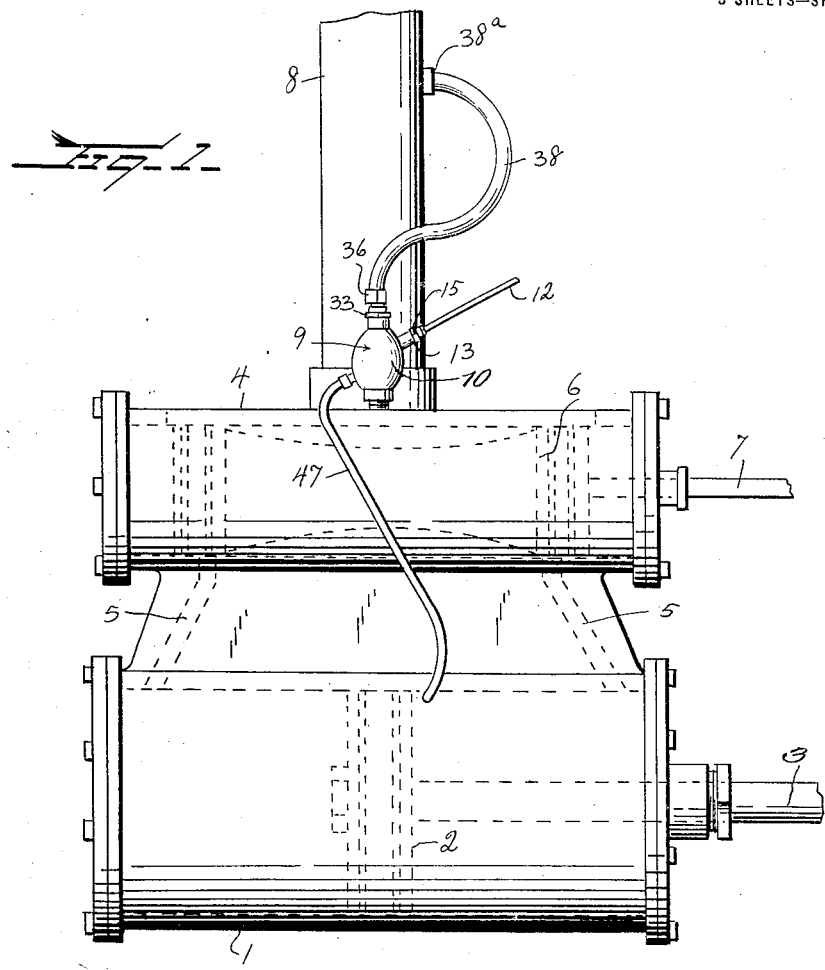
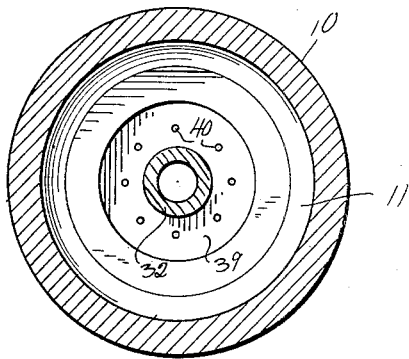
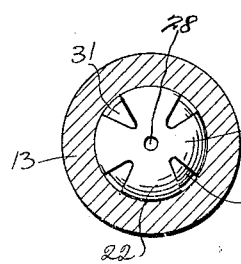
Inventor
H. M. Stevens
By Watson E. Coleman
Attorney

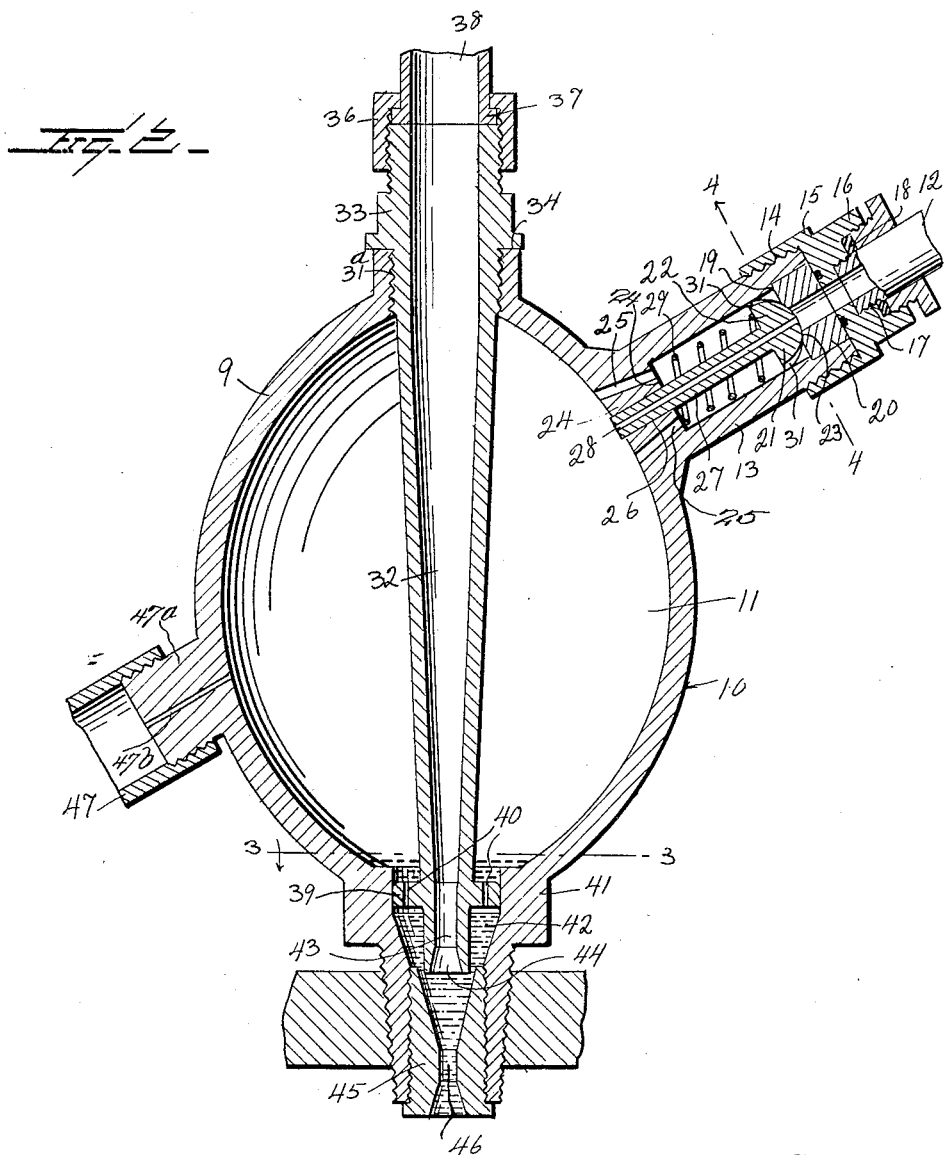

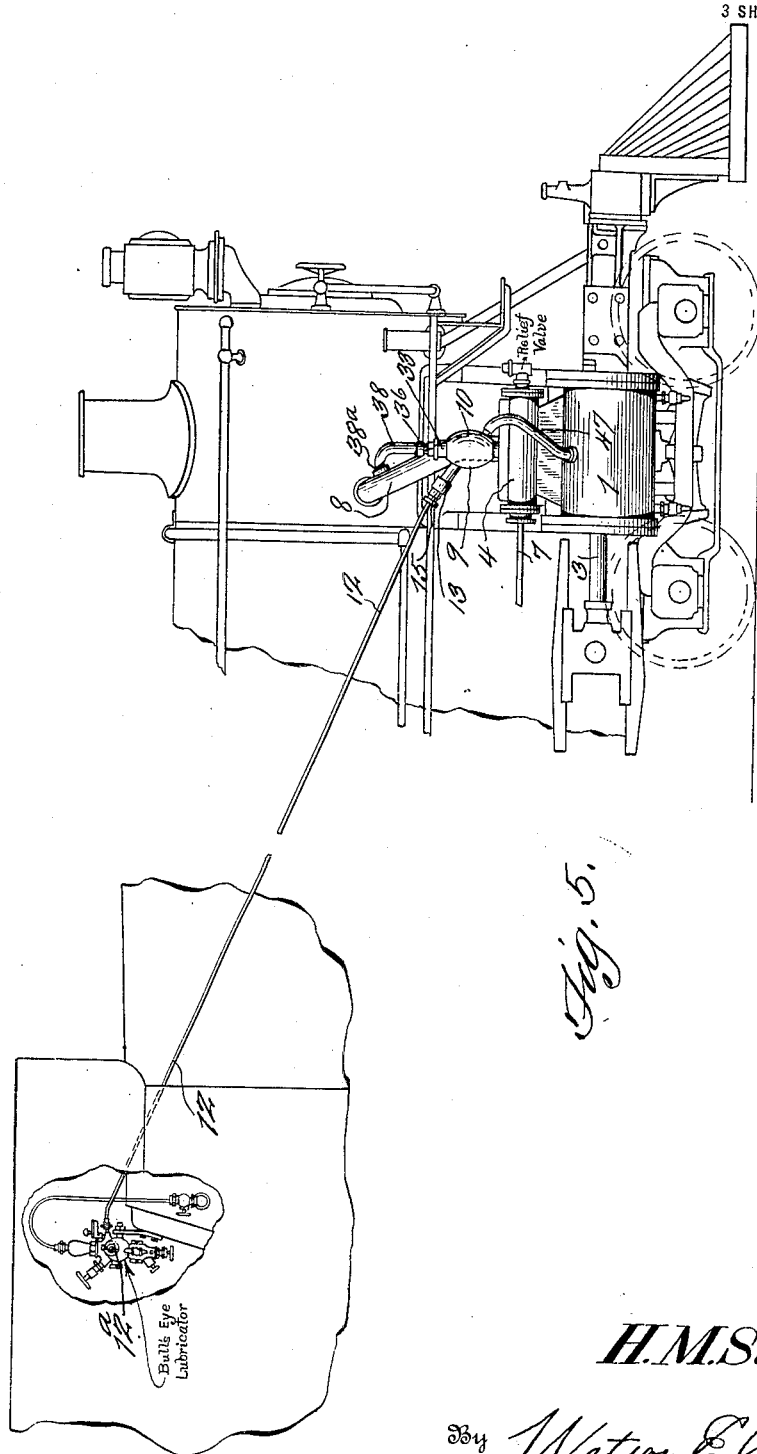

UNITED STATES PATENT OFFICE.

HOWARD Mc STEVENS, OF SOMERSET, KENTUCKY, ASSIGNOR OF ONE-HALF TO RALPH T. HODGES, OF SOMERSET, KENTUCKY.

LUBRICATING DEVICE FOR VALVES AND CYLINDERS OF SUPERHEATING-LOCOMOTIVES.

1,351,807.

Specification of Letters Patent.

Patented Sept. 7, 1920.

Application filed April 28, 1919. Serial No. 293,274.

*To all whom it may concern:*

Be it known that I, HOWARD MACK STEVENS, a citizen of the United States, residing at Somerset, in the county of Pulaski and State of Kentucky, have invented certain new and useful Improvements in Lubricating Devices for Valves and Cylinders of Superheating-Locomotives, of which the following is a specification, reference being had to the accompanying drawings.

This invention relates to an improved lubricating gun or device particularly adapted for lubricating valves and cylinders of super-heat engines, which is believed to be the coming engine, but in order to attain the best results, it has been found necessary to graduate the lubricant into the valves and the cylinders while the steam is in action.

The present invention aims to provide a constant feed of the lubricant into the valves and cylinders, in order to prevent carbon deposits and explosions in the valves and the cylinders.

It has been found that when the engine is working hard up an incline, the engine valves and the cylinders do not receive their proper lubrications, and when the throttle of the engine is open, the oil will fill the pipes with compression, and dry steam which is lighter than oil, which has been found to be a great disadvantage, particularly in view of the fact that the lubricator in the cab will be feeding, for the lubricant or oil can be observed as passing through the sight glass.

Furthermore, the invention aims to provide a high pressure lubricating gun, which is substantially absolutely positive in action, and will impart a constant feed of distilled greasy or oily water and oil or lubricant to the locomotive valves and cylinders, thereby overcoming the friction in the cylinders and the valves, and consequently avoiding the above mentioned disadvantages.

The invention further aims to provide an improved lubricating gun, capable of increasing the efficiency, enabling the engine to handle considerable tonnage with great ease.

The invention further aims to provide a lubricating gun, the use of which will insure a big saving in fuel and water, and indirectly prolong the life of the flues and the fire box.

The invention further aims to provide a lubricating gun particularly adapted for use on the steam chest of a locomotive, thereby taking the place of the steam chest oil plug. This steam or lubricating gun will prime and deliver the lubricant under high pressure in a manner similar to the operation of a water injector on a steam boiler.

While the design and construction at present illustrated and set forth is deemed preferable, it is obvious that as a result of a reduction of the invention to a more practical form for commercial purposes, the invention may be susceptible to changes, and the right to these changes is claimed, provided they are comprehended within the scope of what is claimed.

The invention comprises further features and combination of parts, as will be hereinafter set forth, shown in the drawings and claimed.

In the drawings:

Figure 1 is a view in side elevation of a cylinder and steam chest, showing the valve of the steam chest and the piston of a cylinder in dotted lines and also the ports of communication between the interior of the chest and the cylinder in dotted lines, and illustrating the improved lubricating gun as applied.

Fig. 2 is an enlarged detail sectional view through the lubricating gun, showing the same constructed in accordance with the invention, whereby the aforesaid disadvantages may be overcome, and the advantages attained.

Fig. 3 is a sectional view on line 3—3 of Fig. 2.

Fig. 4 is a sectional view on line 4—4 of Fig. 2.

Fig. 5 is a view in side elevation of the forward part of the locomotive, showing the lubricating gun as connected to the steam chest and cylinder, and illustrating the oil and steam line connection to a conventional form of "bull's eye lubricator" in the cab of the locomotive.

Referring more especially to the drawings, 1 designates a steam cylinder of a locomotive, 2 the piston operable therein, shown in dotted lines, 3 the piston rod, and 4 denotes the steam chest, there being ports 5 of communication between the cylinder and the interior of the steam chest, and 6 denotes the slide valve in the steam chest, and 7 the reciprocating rod of the slide valve.

Leading to the steam chest and in communication with the interior thereof is the main steam supply pipe 8 from the boiler, and 9 denotes the improved lubricating gun as a whole. This improved lubricating gun comprises a casing 10 having a chamber 11 for the reception of steam and oil or lubricant from the lubricator. This combined steam and lubricant or oil enters the chamber 11 by way of the pipe or tube 12, which is adapted to be communicatively connected to the lubricator 12$^a$ in the cab of the locomotive. The casing 10 has an extension 13, which is threaded as at 14 to be engaged by the union 15. This union has an extension 16, into which the pipe 12 is threaded as shown at 17, there being a packing gland 18, to insure against leakage of the combined steam and lubricant. The union 15 has an opening, which communicatively connects with the passage through the pipe 12. The interior of the extension 13 has an annular shoulder 19, to be engaged by the drifting valve bushing seat 20, the union 15 acting to hold the seat 20 in position. Mounted in the extension 13 is a drifting valve 21, the semi-spherical face 22 of which coöperates with the spherical valve seat 23 of the seat bushing 20. Where the extension 13 forms an integral part of the casing 10, a wall 24 is constructed, through which the drifting valve ports 25 are formed. This wall 24 is provided with an opening 26 for the reception of the valve stem 27 of the drifting valve 21, there being a passage 28 formed through the stem and through the drifting valve 21. A coil spring 29 is in surrounding relation to the stem 27, and is interposed between the wall 24 and the drifting valve, acting to hold the valve normally closed. The drifting valve 21 is provided at diametrically opposite points with passages 31, to permit of the passage of combined steam and lubricant from the oil line from the lubricator.

One end of the casing 10 has a flanged opening 31$^a$, which is interiorly threaded, and extending through the opening and engaging the threads is a tapering tubular nozzle 32, the upper end of which has an enlargement 33. By means of this enlargement a shoulder 34 is provided, to contact with the flange of the opening 31$^a$, and to which a union nut 36 is connected. This union nut holds the flanged end 37 of the steam pipe 38 to the upper end of the enlargement 33. The steam pipe 38 is designed to communicatively connect to a super-heat steam element, such as at 38$^a$ to the main steam pipe line 8, whereby steam may be allowed to pass through the tapering nozzle 32.

The smaller end of the nozzle has an annular flange 39 provided with a plurality of apertures 40. The lower end of the casing 10 has an extension 41 provided with a mixing chamber 42. The annular flange 39, it will be seen, fits into the upper end of the mixing chamber 42, and since combined lubricant or oil and steam is allowed to enter the chamber 11, it passes through the apertures 40 and into the mixing chamber 42, where it thoroughly mixes with the superheated steam as it enters the chamber 42 from the nozzle 32. It is to be noted that the nozzle 32 is tapering, and that the lower portion of the nozzle terminates in a cylindrical portion 43. That is this portion 43 is drilled cylindrically, but the lower extremity of the nozzle adjacent one end of the cylindrical portion 43, is provided with a counter-sink 44, which is tapering in a direction just the opposite to the taper of the nozzle 32, allowing the super-heated steam to spread as it emanates from the lower end of the nozzle into the chamber 42. A high pressure delivery nozzle 45 is threaded into the lower end of the extension 41 of the casing 10, concentrically with the lower extremity of the nozzle 32, which partially enters the high pressure delivery nozzle. The intermediate portion of the bore of the high pressure delivery nozzle 45 is provided with a cylindrical portion 46, upwardly from which the wall of the bore of the delivery nozzle diverges, and from the lower portion of the intermediate cylindrical portion 46 the wall of the lower end of the bore of the delivery nozzle diverges in the opposite direction. The upper tapering part of the bore of the high pressure delivery nozzle communicates with the chamber 42, and also with the interior of the nozzle, so that when the super-heated steam from the nozzle enters the upper tapering part of the bore of the high pressure nozzle 45, it will thoroughly mix with the combined lubricant or oil and steam which enters the chamber 42 from the chamber 11. The super-heated steam, and the combined steam and lubricant from the chamber 11, after thoroughly mixing in the chamber 42, passes through the high pressure delivery nozzle, and owing to the lower tapered part of the bore of the high pressure delivery nozzle, the mixture will spread, and thoroughly circulate in the interior of the steam chest, into the wall of which the extension 41 of the lubricating gun is threaded, as shown clearly in Fig. 1. The casing 10 has a lateral extension 47$^a$ having a port 47$^b$ and to which the pipe 47 is threaded. This pipe 47 communicatively connects with the steam chamber of the steam cylinder, so as to convey a supply of combined lubricant or oil and steam into the chamber of the steam cylinder, thereby thoroughly lubricating the piston and the wall of the chamber.

It is to be noted that the combined lubricant and steam which enters the chamber 11 is mixed with the super-heated steam in the chamber 42, and owing to the super-heated steam passing through the nozzle 32 with considerable force, the combined steam and lubricant is injected through the high pressure delivery nozzle, into the chamber of the steam chest, thereby spraying the parts therein and also the wall of the steam chest. By this method of lubricating the piston of the cylinder and the slide valve and the steam chest, it will be noted that the locomotive is capable of drifting smoothly with the train, and preventing the train from pushing or bumping the locomotive, and consequently avoiding the various disadvantages herein enumerated.

When the steam of the locomotive is in action and the locomotive is under way or operating, the drifting valve 21 closes with the exception of the passage 28, which is open at all times, and at the time when the engineer closes the throttle of the booster pipe in the cab on the lubricator, a large amount of steam is furnished through the steam and oil line 12 from the lubricator in the cab through the ports 30, while the engine is drifting, and then when the throttle is open the pressure becomes equalized on both sides of the drifting valve, in which case the spring 29 will close the drifting valve 21 against its seat.

By means of the extension, it will be observed how a short pipe connection, such as 47 may be connected between the lubricating gun casing and the cylinder of the locomotive, thereby eliminating the use of a lengthy pipe connection of communication with the cylinder, as heretofore used. The port through this extension is considerably small, allowing just sufficient steam and oil to enter the cylinder, to insure proper lubrication of the piston and the piston rings.

When the engine or locomotive is climbing an incline and the steam is in action, a constant feed of lubrication is allowed to enter the steam chest and cylinders, by properly handling the locomotive valve, which also should be properly lubricated. The amount of steam and lubrication that comes from the steam and oil line of the lubricator while the engine is drifting, will overcome valve cutting and cylinder heat. This will keep the pistons and cylinders cooled while drifting.

It has been found that this improved lubricating gun will operate in conjunction with all lubricators that are at present installed on locomotives, and will keep the back pressure out of the steam and oil line from the lubricator in the cab, down to the steam chest. This present construction of lubricating gun will generate a great amount of its own lubrication. It has been found that oil and distilled steam, which is free from imperfections, provides a superior form of lubrication. In other words, the mixture of distilled water and oil irrespective of the kind of oil, insures a lubrication of the highest degree. It is possible to utilize the cheapest kind of lubricating oil, concentrating it and converting it into oily water, thus eliminating the use of expensive oil, and consequently providing a high-grade lubrication.

Furthermore, this improved lubricating gun will overcome the constant blow from valves and cylinders in the smokestack, and insuring the engine to have a clear exhaust out through the stack, and also a constant blue blaze against the crown and flue sheets.

In the operation of the improved lubricating gun, the casing 10 is charged with steam less than 200 degrees of heat. In fact the casing 10 is charged at all times with a heavy mist of greasy steam somewhat similar to a very thick cloud, there not being any water at all in the casing excepting drops of water sticking to the walls of the casing. However, the hot steam nozzle running down into the casing 10 will keep the greasy mist of steam circulating on the interior of the casing 10 and the drops of greasy water running down from the inner walls of the casing 10 under the steam nozzle 44, will mix with the super-heat steam and will be sprayed into the locomotive valve through the high pressure port 46. The constant delivery of such fluid through the high pressure nozzle of port 46 will be kept up, since the chamber 42 is at all times kept supplied with greasy water, owing to the drops of such material feeding down the inner surface of the wall of the casing 10. Owing to the casing 10 being exposed to the cold wind, the steam and oil (which is received from the lubricator in the cab) is kept condensing very fast against the walls of the casing 10, in the form of greasy water drops which will, as before stated, travel down the inner surface of the wall of the casing 10 and into the chamber 42, where it will mix with the super-heat steam from the nozzle 44 and will be sprayed into the valve chamber. In Fig. 2 of the drawings the water and oil level is indicated at 40ª.

When the steam from the lubricator in the cab is utilized, the gun will prime itself, and when the throttle is opened the gun will supply the valve and the interior of the cylinder with greasy, oily water. By maintaining a constant feed of oily water in the valve chest of the cylinder, the walls of the steam chest and the cylinder will be given a mirror finish, and furthermore the cylinder and the steam chest will be well lubricated. By the use of a lubricating gun of this character, the piston oil cup and the swab and the swab holders of the locomotive can be eliminated.

When the throttle is closed, the locomotive or engine is capable of drifting smoothly and without friction in the cylinders, thereby preventing interference with the counterbalance while drifting, thereby avoiding a tendency to pound the side rods. Furthermore, by the use of a lubricating gun, the back pressure in the lubricator in the cab is eliminated, thereby preventing any pressure from the oil and steam line.

Also by the provision of a lubricating gun the constant blow-out through the stack is avoided, hence eliminating a high temperature in the fire box, which would cause the water in the boiler to become unnecessarily agitated and cause what is termed "boiler foaming." By avoiding a high temperature in the fire box, the boiler foaming is prevented, which in turn will prevent the side sheets from becoming too hot, which would create gas bubbles on the inside of the boiler on the crown piece. By preventing the gas bubbles from collecting, injury to the crown piece is prevented.

The invention having been set forth, what is claimed as new and useful is:

1. In a device as set forth, the combination with a steam cylinder and a steam chest, of a lubricant gun mounted on the chest and communicatively connected thereto, said gun comprising a casing having a combined steam and oil chamber and a mixing chamber, a communicative connection between the casing and the steam supply pipe of the steam chest, said communicative connection having a nozzle extending through said casing and terminating in the mixing chamber, for supplying super-heated steam thereinto, said mixing chamber and the interior of the casing being communicatively connected, whereby combined steam and oil may enter the mixing chamber, where it is injected into the steam chest by the super-heated steam through the nozzle, and means communicatively connecting the lubricators of the locomotive and the casing of the gun.

2. In a device as set forth, the combination with a steam cylinder and a steam chest, of a lubricant gun mounted on the chest and communicatively connected thereto, said gun comprising a casing having a combined steam and oil chamber and a mixing chamber, a communicative connection between the casing and the steam supply pipe of the steam chest, said communicative connection having a nozzle extending through said casing and terminating in the mixing chamber, for supplying super-heated steam thereinto, said mixing chamber and the interior of the casing being communicatively connected, whereby combined steam and oil may enter the mixing chamber, where it is injected into the steam chest by the super-heated steam through the nozzle, and means communicatively connecting the lubricators of the locomotive and the casing of the gun, said last named means comprising a coupling whereby said means is connected to the casing of the gun, said coupling including a drifting valve, tensioning means therefor, said drifting valve being controlled according to the pressure of the steam and lubricant in the lubricators of the locomotive.

3. The combination with a steam cylinder and steam chest, of a lubricating gun mounted on and communicatively connected to the steam chest, a communicative connection between the super-heated steam supply of the steam chest and the lubricating gun, such connections having a nozzle extending through the casing of the lubricating gun, the casing of the lubricating gun being provided with a high pressure delivery nozzle communicatively connecting with the steam chest, a mixing chamber between the first and second nozzles, a communicative connection between the casing of the lubricating gun and the lubricators of the cab of a locomotive for supplying the steam and oil into the casing of the gun, whereby it may enter the mixing chamber, and intermingle with the super-heated steam.

4. The combination with a steam cylinder and steam chest, of a lubricating gun mounted on and communicatively connected to the steam chest, a communicative connection between the super-heated steam supply of the steam chest and the lubricating gun, such connections having a nozzle extending through the casing of the lubricating gun, where the casing of the lubricating gun connects to the steam chest being provided with a high pressure delivery nozzle, a mixing chamber between the first and second nozzles, a communicative connection between the casing of the lubricating gun and the lubricators of the cab of a locomotive for supplying the steam and oil into the casing of the gun, whereby it may enter the mixing chamber, and intermingle with the super-heated steam, and a communicative connection between the casing of the gun and the steam cylinder, for furnishing a combined supply of steam and oil to the cylinder.

5. The combination with a steam cylinder and steam chest, of a lubricating gun casing mounted on and in communicative connection with the steam chest, said casing having a communicative connection with the super-heated steam supply to the chest, whereby super-heated steam is conveyed into the casing, and thence into the chest, means for conveying combined steam and oil into the casing, a communicative connection between the casing and the steam cylinder, whereby combined oil and steam is carried in the steam cylinder, said casing having a mixing chamber, in which the super-heated steam, and the combined steam and oil is mixed.

6. The combination with a steam cylinder and steam chest, of a lubricating gun casing provided with a chamber for the reception of combined oil and steam, said casing having a high pressure nozzle connection of communication with the steam chest, a mixing chamber between the high pressure nozzle and the first chamber, a communicative connection between the casing and a super-heated steam supply to the steam chest, said last mentioned communicative connection having a nozzle extending through the first chamber and into the mixing chamber, to convey the super-heated steam into the mixing chamber, said last mentioned nozzle having an annular flange provided with ports of communication, whereby combined oil and steam from the first chamber may be conveyed into the mixing chamber to mix with the super-heated steam, and means connected to the lubricators in the cab of a locomotive for conveying combined oil and steam into the lubricating gun casing.

7. The combination with a steam cylinder and steam chest, of a lubricating gun mounted on and communicatively connected to the steam chest, a communicative connection between the super-heated steam supply of the steam chest and the lubricating gun, said connections having a nozzle extending through the casing of the lubricating gun, the casing of the gun being provided with a high pressure delivery nozzle, a mixing chamber between the chest and second nozzle, a communicative connection between the casing of the gun and the lubricators of the cab of the locomotive for supplying the steam and oil into the casing of the gun, whereby it may enter the mixing chamber and intermingle with the super-heated steam, said last mentioned connection including a drifting valve provided with a passage therethrough and ports in its periphery, whereby when the valve is closed, and when the throttle of the booster pipe in the cab on the lubricator is open, considerable steam is allowed to pass through the steam and oil line through the peripheral ports of the valve while the engine is drifting to equalize the pressure on both sides of the valve, and means acting to close the valve when the pressure is equalized on both sides thereof.

8. In a device as set forth, a steam cylinder, a steam chest in communication therewith, a super-heated steam supply for the chest, a lubricating gun casing connecting said supply and the chest and provided with a mixing chamber, means for conveying combined steam and oil into the casing, means connecting the casing and the steam cylinder for conveying combined oil and steam into said cylinder, and means for conveying super-heated steam into the mixing chamber to mix with the steam and oil.

9. In a device as set forth, a steam cylinder, a steam chest connecting therewith, a super-heated steam supply connected to the chest, a lubricating gun casing having a mixing chamber and being connected to the chest, means connecting the mixing chamber and the super-heated steam supply, means for conveying combined oil and steam into the casing, and means connecting the mixing chamber and the interior of the gun casing, whereby the combined oil and steam may mix with the super-heated steam and be injected into the chest.

10. In a device as set forth, a steam cylinder, a steam chest connecting therewith, a super-heated steam supply connected to the chest, a lubricating gun casing having a mixing chamber and being connected to the chest, means connecting the mixing chamber and the super-heated steam supply, means for conveying combined oil and steam into the casing, and means connecting the mixing chamber and the interior of the gun casing, whereby the combined oil and steam may mix with the super-heated steam and be injected into the chest, said means for conveying combined oil and steam including a drifting valve provided with peripheral ports, whereby when the valve is closed and the throttle of the booster pipe in the cab on the lubricator is open, considerable steam is allowed to pass through the combined steam and oil means, while the engine is drifting to equalize the pressure on both sides of said valve, and means acting to close the valve when the pressure is equalized on both sides thereof.

11. In a device as set forth, a steam cylinder, a steam chest connected therewith, a super-heated steam supply therefor, a lubricator in the cab of the locomotive and including a booster pipe, a lubricating gun casing connected to the shaft, means connecting said casing and the lubricator in the cab for conveying combined oil and steam into the casing, said combined oil and steam conveying means including a device for permitting considerable steam to pass through said steam and oil line, when said device is closed and when the throttle of the booster pipe is open, while the engine is drifting in order to equalize the pressure on both sides of said device, and means connecting the gun casing and the super-heated steam supply.

12. In a device as set forth, a steam cylinder, a steam chest connected therewith, a super-heated steam supply therefor, a lubricator in the cab of the locomotive and including a booster pipe, a lubricating gun casing connected to the shaft, means connecting said casing and the lubricator in the cab for conveying combined oil and steam into the casing, said combined oil and steam conveying means including a device for permitting considerable steam to pass through said steam and oil line, when said device is closed and when the throttle of the booster pipe is open, while the engine is drifting in order to equalize the pressure on both sides of the device, and means connecting the gun casing and the super-heater steam supply, and provided with means for injecting combined super-heated steam and oil into the chest.

13. In a device as set forth, a steam cylinder, a steam chest connected therewith, a super-heated steam supply therefor, a lubricator in the cab of the locomotive and including a booster pipe, a lubricating gun casing connected to the shaft, means connecting said casing and the lubricator in the cab for conveying combined oil and steam into the casing, said combined oil and steam conveying means including a device for permitting considerable steam to pass through said steam and oil line, when said device is closed and when the throttle of the booster pipe is open, while the engine is drifting in order to equalize the pressure on both sides of said device, said gun casing having a mixing chamber injector means connecting the mixing chamber and the super-heated steam supply for conveying super-heated steam into said mixing chamber to mix the combined oil and steam and inject the entire fluid into the chest.

14. In a device as set forth, a steam cylinder, a steam chest connected therewith, a super-heated steam supply therefor, a lubricator in the cab of the locomotive and including a booster pipe, a lubricating gun casing connected to the shaft, means connecting said casing and the lubricator in the cab for conveying combined oil and steam into the casing, said combined oil and steam conveying means including a device for permitting considerable steam to pass through said steam and oil line, when said device is closed and when the throttle of the booster pipe is open, while the engine is drifting in order to equalize the pressure on both sides of said device, said gun casing having a mixing chamber, injector means connecting the mixing chamber and the super-heated steam supply for conveying super-heated steam into said mixing chamber to mix the combined oil and steam and inject the entire fluid into the chest, and means connecting the gun casing and the steam cylinder for by-passing combined oil and steam into the cylinder.

15. In a device as set forth, a steam cylinder, a steam chest connected therewith, a super-heated steam supply therefor, a lubricator in the cab of the locomotive and including a booster pipe, a lubricating gun casing connected to the shaft, means connecting said casing and the lubricator in the cab for conveying combined oil and steam into the casing, said combined oil and steam conveying means including a device for permitting considerable steam to pass through said steam and oil line, when said device is closed and when the throttle of the booster pipe is open, while the engine is drifting in order to equalize the pressure on both sides of said device, and means connecting the gun casing and the super-heated steam supply, and means acting to close said device when the pressure is equalized on both sides thereof.

16. In a device as set forth, a steam cylinder, a steam chest connected therewith, a super-heated steam supply for the chest, means connecting the supply with the chest, a lubricator in the cab of the locomotive, means connecting said last named means and the lubricator, and including a drifting valve provided with means to permit a substantial supply of steam to pass through the steam and oil line when the valve is closed and the throttle of the booster pipe of the lubricator in the cab is open, while the locomotive is drifting to equalize the pressure on both sides of the valve.

17. In a device as set forth, a steam cylinder, a steam chest therefor, a super-heated steam supply connected to the chest, a steam and oil chamber connected to the chest, a lubricator in the cab of the locomotive, means connecting said chamber and the lubricator for conveying combined oil and steam into said chamber, means for conveying the combined oil and steam from the chamber to the cylinder.

18. In a device as set forth, a steam cylinder, a steam chest therefor, a super-heated steam supply connected to the chest, a steam and oil chamber connected to the chest, a lubricator in the cab of the locomotive, means connecting said chamber and the lubricator for conveying combined oil and steam into said chamber, means for conveying the combined oil and steam from the chamber to the cylinder, a mixing chamber communicating with the oil and steam chamber, and means connecting the super-heated steam supply and the mixing chamber, whereby combined oil and steam from the first chamber may mix with and be injected by the super-heated steam into the steam chest.

In testimony whereof I hereunto affix my signature in the presence of two witnesses.

HOWARD Mc STEVENS.

Witnesses:
SAM FERRELL,
GEORGE ORWIN.